US010373461B2

(12) United States Patent
Li et al.

(10) Patent No.: US 10,373,461 B2
(45) Date of Patent: Aug. 6, 2019

(54) SYSTEM AND METHOD FOR VIDEO PREVIEW

(71) Applicant: Shanghai Xiaoyi Technology Co., Ltd., Shanghai (CN)

(72) Inventors: Feng Li, Shanghai (CN); Lili Zhao, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/092,544

(22) Filed: Apr. 6, 2016

(65) Prior Publication Data

US 2017/0206761 A1 Jul. 20, 2017

(30) Foreign Application Priority Data

Jan. 15, 2016 (CN) ......................... 2016 1 0029095

(51) Int. Cl.
*G08B 13/196* (2006.01)
*G06K 9/00* (2006.01)
*G11B 27/06* (2006.01)

(52) U.S. Cl.
CPC ... *G08B 13/19691* (2013.01); *G06K 9/00744* (2013.01); *G08B 13/1961* (2013.01); *G08B 13/19602* (2013.01); *G08B 13/19682* (2013.01); *G11B 27/06* (2013.01); *G06K 2009/00738* (2013.01)

(58) Field of Classification Search
CPC ..................................................... H04N 7/025
See application file for complete search history.

(56) References Cited

U.S. PATENT DOCUMENTS

| | | | | |
|---|---|---|---|---|
| 2006/0062292 A1* | 3/2006 | Boice | H04N 19/172 | 375/240.01 |
| 2006/0200842 A1* | 9/2006 | Chapman | H04N 7/163 | 725/34 |
| 2007/0217765 A1* | 9/2007 | Itoh | H04N 5/76 | 386/202 |
| 2007/0294716 A1* | 12/2007 | Jeong | G06K 9/00711 | 725/19 |

(Continued)

FOREIGN PATENT DOCUMENTS

| | | |
|---|---|---|
| CN | 1608242 A | 4/2005 |
| CN | 101044470 A | 9/2007 |
| EP | 1528807 A1 | 5/2005 |

OTHER PUBLICATIONS

Chinese Office Action issued by the State Intellectual Property Office of the People's Republic of China in counterpart Chinese Patent Application No. 201610029095.9 dated Nov. 16, 2017.

*Primary Examiner* — Samira Monshi
(74) *Attorney, Agent, or Firm* — Cantor Colburn LLP

(57) ABSTRACT

A method for presenting a preview of a video includes receiving a plurality of video preview frames and information relating to a special event detected in the video. The plurality of video preview frames are extracted from the video. The special event is identified from an analysis of the video, and includes at least one of an object, a moving object, or a sound detected in the video. The method further includes displaying at least one of the received plurality of video preview frames, and displaying an indicator indicating the special event.

25 Claims, 7 Drawing Sheets

(56) References Cited

U.S. PATENT DOCUMENTS

2010/0123830 A1* 5/2010 Vunic ................ G06K 9/00711
348/700
2015/0326814 A1* 11/2015 Stephens ................ H04N 5/445
725/32

* cited by examiner

SYSTEM AND METHOD FOR VIDEO PREVIEW

CROSS-REFERENCE TO RELATED APPLICATION

This application is based upon and claims the benefit of priority from Chinese Patent Application No. 201610029095.9, filed on Jan. 15, 2016, the disclosure of which is expressly incorporated herein by reference in its entirety.

TECHNICAL FIELD

The present disclosure generally relates to previewing a video, and more specifically relates to systems and methods for displaying video preview frames of a video.

BACKGROUND

Video monitoring devices allow individuals and businesses to monitor premises for various purposes, including, for example, security, baby or elderly monitoring, videoconference, etc. Such video monitoring devices may record videos continuously, generating a huge amount of video data every day. Reviewing video data, however, may be challenging. For example, a user may not have enough time to review a video in its entirety.

Such inconvenience may be partially resolved by displaying some video preview frames extracted from the video so that a user can review the video preview frames instead of the whole video. Although this method may be easy to implement, there are shortcomings. For example, in the method, a video preview frame may be extracted from the video every certain period of time. The extracted video preview frames may not catch all special events (e.g., a baby crying). Thus, a user who only reviews these video preview frames may miss some special events. In addition, the video preview frames presented to the user may look the same, and the user may still miss a special event included in the video preview frames if there is no indication that the special event occurred.

SUMMARY

One aspect of the present disclosure is directed to a device for presenting a preview of a video. The device includes a memory device configured to store instructions, and one or more processors configured to execute the instructions to receive a plurality of video preview frames and information relating to a special event detected in the video. The plurality of video preview frames are extracted from the video. The special event is identified from an analysis of the video, and includes at least one of an object, a moving object, or a sound detected in the video. The device also includes a display in communication with the one or more processors. The display is configured to display at least one of the received plurality of video preview frames, and display an indicator indicating the special event.

Another aspect of the present disclosure is directed to a system for generating video preview frames for a video. The system includes a memory device that stores instructions, and one or more processors configured to execute the instructions. The one or more processors execute the instructions to receive a video, analyze the video, and identify a special event from an analysis of the video. The special event including at least one of an object, a moving object, or a sound detected in the video. The one or more processors execute the instructions further to obtain at least one video frame representing the special event, and transmit, to a user, the at least one video frame representing the special event, and information relating to the special event.

Yet another aspect of the present disclosure is directed to a method for presenting a preview of a video. The method includes receiving a plurality of video preview frames and information relating to a special event detected in the video. The plurality of video preview frames are extracted from the video. The special event is identified from an analysis of the video, and includes at least one of an object, a moving object, or a sound detected in the video. The method further includes displaying at least one of the received plurality of video preview frames, and displaying an indicator indicating the special event.

Yet another aspect of the present disclosure is directed to a method for generating video preview frames for a video. The method includes receiving a video, analyzing the video, and identifying a special event from an analysis of the video. The special event includes at least one of an object, a moving object, or a sound detected in the video. The method further includes obtaining at least one video frame representing the special event, and transmitting, to a user, the at least video frame representing the special event and information relating to the special event.

Yet another aspect of the present disclosure is directed to a non-transitory computer readable medium embodying a computer program product, the computer program product comprising instructions configured to cause a computing device to receive a plurality of video preview frames and information relating to a special event detected in the video. The special event is identified from an analysis of the video, and includes at least one of an object, a moving object, or a sound detected in the video. The plurality of video preview frames are extracted from the video. The computer program product includes instructions further configured to cause the computing device to display at least one of the received plurality of video preview frames, and display an indicator indicating the special event.

DESCRIPTION OF DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
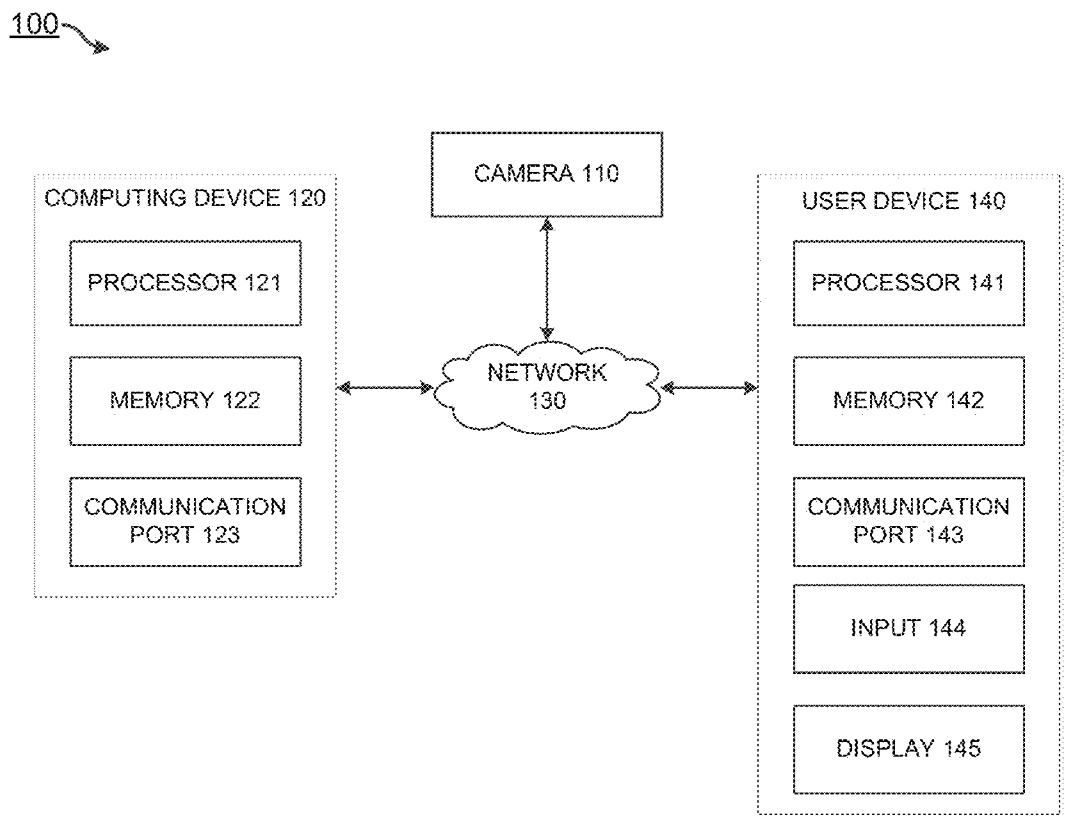
FIG. 1 is a block diagram of an exemplary system for previewing a video according to some embodiments.

The disclosure is directed to a system and method for presenting a video and/or video preview frames to a user. For example, FIG. 1 illustrates a system 100 including a camera 110, a computing device 120, a network 130, and a user device 140. Camera 110 is a device configured to capture a video. For example, the camera may be a digital camera, a web camera, a smartphone, a tablet, a laptop, a video gaming console equipped with a web camera, etc. Camera 110 may also be configured to transmit the video to computing device 120 and/or user device 140 via network 130. In some embodiments, camera 110 may be configured to transmit a stream video to computing device 120 and/or user device 140 in real time.

In some embodiments, camera 110 and computing device 120 are packaged in a single device configured to perform functions of camera 110 and computing device 120 disclosed in this application. In some embodiments, camera 110 may also include one or more processors and memory configured to perform one or more processes described in this application. For example, camera 110 may be configured to generate sample videos and/or video preview frames, and transmit the sample videos and/or video preview frames to user device 140, as described elsewhere in this disclosure.

Computing device 120 is configured to analyze the video received from camera 110. For example, computing device 120 is configured to extract a plurality of video frames from the video. Computing device 120 is also configured to detect one or more special events by analyzing the extracted video frames. In some embodiments, computing device 120 may extract a sound track from the video and detect one or more special events by analyzing the sound track.

Computing device 120 is further configured to extract sample videos from the video received from camera 110. For example, computing device 120 is configured to extract a first sample video, and skip a period of time before extracting a second sample video. Merely by way of example, computing device 120 may extract from the video a first sample video with a length of 10 seconds and skip 20 seconds of the video. Computing device 120 may be configured to then extract a second sample video with a length of 10 seconds, and skip 20 seconds of the video before extracting a third sample video. In other words, computing device 120 may extract a 10-second video sample for every 30-second video. Computing device 120 may also be configured to extract one or more video preview frames from the extracted sample videos.

In some embodiments, computing device 120 is a computer server, a desktop computer, a notebook computer, a tablet computer, a mobile phone, a personal digital assistant (PDA), or the like. Computing device 120 includes, among other things, a processor 121, memory 122, and communication port 123. In operation, processor 121 executes computer instructions (program code) and performs functions in accordance with techniques described herein. For example, processor 121 receives and analyzes a video captured by camera 110, and detects one or more special events included in the video, as described elsewhere in this disclosure. Processor 121 may include or be part of one or more known processing devices such as, for example, a microprocessor. In some embodiments, processor 121 may include any type of single or multi-core processor, mobile device microcontroller, central processing unit, etc.

Memory 122 is configured to store one or more computer programs to be executed by processor 121 to perform exemplary functions disclosed herein. For example, memory 122 may be configured to store program(s) that may be executed by processor 121 to extract image frames from the video received from camera 110, and detect one or more special events by analyzing the image frames. Memory 122 may also be configured to store data and/or parameters used by processor 121 in methods described in this disclosure. For example, memory 122 may store one or more sound models for detecting a special event included in a video. Processor 121 can access the sound model(s) stored in memory 122, and detect one or more special events based on a sound signal included in the video and the accessed sound model(s).

Memory 122 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 123 is configured to transmit to and receive data from, among other devices, camera 110 and user device 140 over network 130. Network 130 may be any type of wired or wireless network that allows transmitting and receiving data. For example, network 130 may be a wired network, a local wireless network, (e.g., Bluetooth™, WiFi, near field communications (NFC), etc.), a cellular network, the Internet, or the like, or a combination thereof. Other known communication methods which provide a medium for transmitting data between separate are also contemplated.

User device 140 is configured to receive data (e.g., image and/or video data) from camera 110 and/or computing device 120 via network 130. User device 140 is also configured to present images and/or videos to the user. User device 140 is further configured to interact with the user for presenting images and/or videos via its user interface (UI). For example, user device 140 may play a video in a UI. Preview video frames may also be presented in the UI. The UI is also configured to present a particular video preview frame or play the video from a particular time point based on an input received from the user. For example, the user may touch the screen as input 144 and select a video preview frame shown in the UI. The video may be played in the UI starting from a time point that is the closest to the time stamp of the selected video preview frame.

User device 140 may be any type of computing device. For example, user device 140 may be a smart phone, a tablet, a personal computer, a wearable device (e.g., Google Glass™ or smart watches, and/or affiliated components), or the like, or a combination thereof. In some embodiments, user device 140 and computing device 120 may together be included in a computing device configured to perform exemplary functions of user device 140 and computing device 120 disclosed in this application.

In some embodiments, user device 140 is a computer server, a desktop computer, a notebook computer, a tablet computer, a mobile phone, a personal digital assistant (PDA), or the like. User device 140 includes, among other things, a processor 141, a memory 142, a communication port, an input 144, and a display 145.

Processor 141 executes computer instructions (program code) and performs functions of user device 140 in accordance with techniques described herein. For example, processor 141 is configured to receive image and/or video data from computing device 120 and/or camera 110 via network 130. Processor 141 also controls display 145 to present videos and/or images in a UI. Processor 141 is further configured to receive one or more inputs from the user via input 144, and control display 145 to present videos and/or images in the UI based on the received input(s). Processor 141 may include or be part of one or more known processing devices such as, for example, a microprocessor. In some embodiments, processor 141 may include any type of single or multi-core processor, mobile device microcontroller, central processing unit, etc.

Memory 142 is configured to store one or more computer programs execution by processor 141 to perform exemplary functions of user device 140 disclosed in this application. For example, in some embodiments, memory 142 is configured to store program(s) for execution by processor 141 to control display 145 to present videos and/or images. Memory 142 is also configured to store data and/or parameters used by processor 141 in methods described in this disclosure. Memory 142 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 142 is configured to transmit to and receive data from, among other devices, camera 110 and user device 140 over network 130. Input 144 is configured to receive inputs from the user and transmit the data/signal relating to the received inputs to processor 141 for further processing. For example, the user may select a video preview frame shown in the UI via a touch screen (i.e., a part of input 144). In response, input 144 transmits the data relating to the user's action to processor 141. The processor may then play the video starting from a time point closest to a time stamp of the video preview frame. Display 145 may be any device configured to display, among other things, videos and/or images in the UI based on the display data fed by processor 141.

Figure 2:
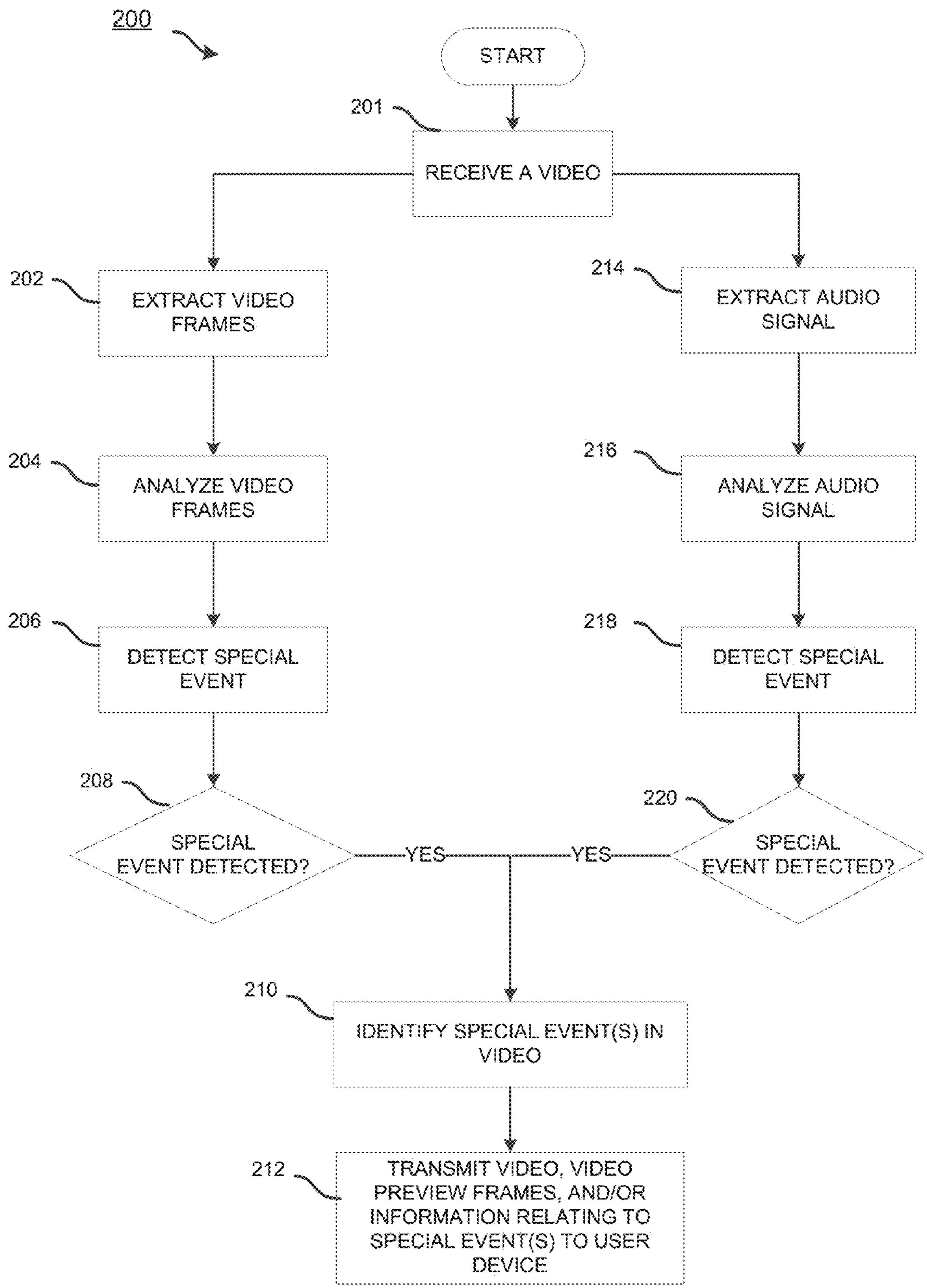
FIG. 2 is a flowchart of an exemplary process for identifying a special event based on analysis of video frame(s) and/or audio signal according to some embodiments.

FIG. 2 is a flowchart of an exemplary process 200 for identifying one or more special events in a video. At 201, processor 121 of computing device 120 receives a video from camera 110 via, for example, network 130. Processor 121 may optionally pre-process the received video. For example, processor 121 may convert the received video into a lower resolution, thereby reducing computing requirements in later stages of the process.

Processor 121 may detect one or more special events based on video frames extracted from the video. For example, at 202, processor 121 extracts a plurality of video frames from the video. Processor 121 may extract the video frames from the video continuously. Alternatively, one video frame may be extracted within a period of time. Merely by way of example, processor 121 may extract one video frame from every second or every minute of the video. In some embodiments, the rate of extracting video frames may be adjustable. For example, initially one video frame may be extracted for every minute of the video. A special event may be detected at some time point of the video (e.g., a moving object is detected). From that time point on (and/or a certain period of time before the time point), the rate of extracting video frames may increase to, for example, 30 frames per minute from the previous rate of one frame per minute. The rate may decrease if no more events are detected subsequently within a period of time. For example, the rate may decrease back to one frame per minute if the moving object previously detected is not included in the video for, for example, 10 minutes.

Processor 121 analyzes the extracted video frames at 204. For example, processor 121 may analyze the video frames to identify an object included in the images. An exemplary process for analyzing video frames is described in detail below in connection with FIG. 6. Processor 121, at 206, detects one or more special events based on the analysis of the video frames. Exemplary special events may include a motion event (e.g., a moving object is detected), object recognition (e.g., a criminal suspect is recognized), emergence event (e.g., a fire incidence is detected), etc. For example, processor 121 may detect a motion event included in a video by determining a difference in pixel values of a video frame and those of a preceding video frame. If the difference exceeds a threshold, a motion event is identified.

At 208, processor 121 determines whether any special event is detected. If so, at 210, processor 121 identifies the special event(s) in the video based on the extracted video frames. For example, processor 121 may obtain a time stamp (e.g., the starting time of the special event) and/or a time window (e.g., the starting time and ending time of the special event) for the detected special event. Processor 121 may also obtain starting and ending points of the event. Processor 121 may further identify the video frames associated with the detected special event (e.g., the video frames during the special event, and within a period of time before and/or after the special event). Processor 121 may also instruct memory 122 to store the identified video frames for future use. For example, processor 121 may select one or more identified video frames as video preview frames sent to user device 140 for the user's review, as described elsewhere in this disclosure. In some embodiments, processor 121 may also extract one or more segments of the video including the detected special event. Processor 121 may further transmit the video segments to user device 140 for the user's review at 212, as described elsewhere in this disclosure.

In some embodiments, processor 121 may identify one or more special events based on an audio signal of the video, as an alternative or in addition to detecting one or more special events based on video frames described above (i.e., steps 202 through 208). For example, at 214, processor 121 extracts an audio signal from the video. Processor 121, at 216, analyzes the extracted audio signal. Merely by way of example, processor 121 may determine whether there is any speech or any particular sound (e.g., baby crying, glass shattering, etc.) included in the audio signal. An exemplary process for analyzing an audio will be described in detail below in connection with FIG. 7.

Processor 121, at 218, detects one or more special events based on the analysis of the audio signal. For example, processor 121 may detect a break-in event based on the detected sound of shattering glass (e.g., a window) in the audio signal. At 220, processor 121 determines whether there is any special event detected. If so, at 210, processor 121 identifies the special event in the video based on the audio signal. Processor 121 also determines a category and/or alert level associated with the special event, as described elsewhere in this disclosure. Processor 121 may further instruct memory 122 to store one or more segments of the audio signal that are associated with the special event. Processor 121 may also transmit the audio segment to user device 140 for the user's review at 212, as described below.

In some embodiments, a detected special event based on the analysis of video frames may be cross-referenced with the audio signal of the video to confirm the detected special event, and vice versa. For example, if a special event has been identified based on video frames extracted from the video, processor 121 may check whether a similar special event is also present in the audio signal around the same time. If so, processor 121 associates the two events together and treats them as one signal event.

Merely by way of example, processor 121 may detect a break-in event based on the video frames (at, for example, step 206). Processor 121 then obtains a time stamp and/or time window associated with the event. Processor 121 then determines whether a similar event is also detected in the audio signal around the time stamp and/or time window associated with the break-in event (e.g., within a period of 1 minute before the time stamp to 1 minute after the time stamp). If so, processor 121 treats the two events as a single event. Alternatively, processor 121 may also analyze the audio signal around the time stamp and/or time window associated with the break-in event (at, for example, step 216). A sound associated with the break-in event detected by processor 121 may be used to confirm the special event detected based on the analysis of the video frames. In another example, a special event (e.g., a shattering sound) is detected based on the audio signal, and the time stamp and/or time window associated with the special event is obtained. Processor 121 then checks whether any special event is detected based on the video frames around the same time. Alternatively or additionally, processor 121 extracts video frames around the time point at which the shattering sound is detected. Processor 121 then analyzes the video frames and determines whether a special event is detected around that time point. If a special event is detected, processor 121 treats the two events as one event.

In some embodiments, processor 121 determines a score of cross-referencing two detected special events around the same time that are detected separately by analyzing the video frames and the audio signal. If the determined score equals to or exceeds a threshold, processor 121 counts the events as a single special event and performs step 210 as described. On the other hand, if the score is less than the threshold, processor 121 does not recognize them as a special event. In doing so, a false event may be prevented from being recorded. For example, if a special event is detected based on the video frames and another special event around the same time is also detected based on the audio signal, processor 121 determines a score of 3 for two events (1.5 for each). The score exceeds a threshold of 2, and processor 121 identifies and counts the two events as one special event. In another example, a special event is detected based on the audio signal, but no special event is detected based on the video frames around the same time, and processor 121 determines a score of 1.5. The score is lower than the threshold score of 2. As a result, processor 121 ignores this event detected based on the audio signal because the special event detected based on the audio signal may be caused by sound outside of the premises. In some embodiments, when determining the score, processor 121 gives a different weight to special events detected based on the video frames than to those detected based on the audio signal. Alternatively or additionally, a score weight for a special event may be associated with a category and/or alert level of the special event detected.

At 212, processor 121 transmits the video, video preview frames, and/or the information relating to the detected special event(s) (if any) to user device 140 via network 130. For example, processor 121 transmits the video to user device 140. Alternatively, a lower-resolution version of the video is transmitted to user device 140. In some embodiments, if there is any special event detected in the video, processor 121 also transmits the information relating to the special event(s), including, for example, the time stamp(s) and/or time window(s) associated with the special event(s). The information may also include the category/categories and/or alert level/levels associated with the special event(s).

Figure 3:
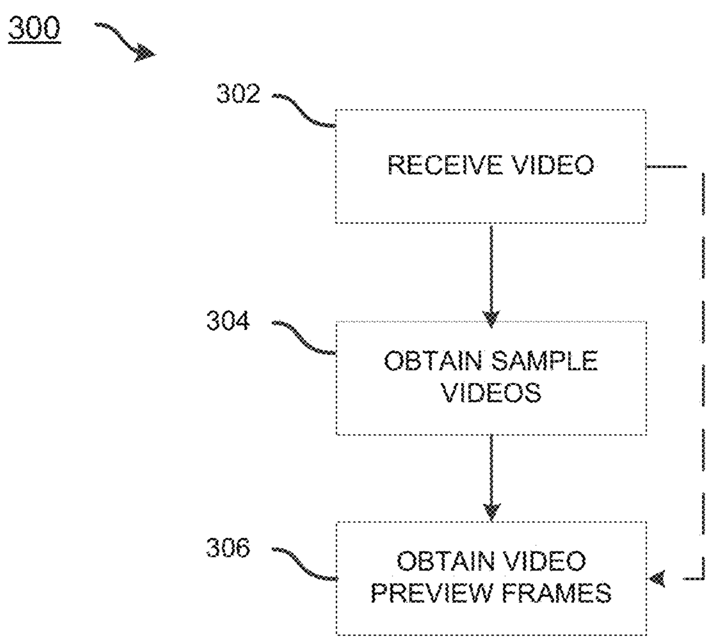
FIG. 3 is a flowchart of an exemplary process for generating video preview frames according to some embodiments.

Alternatively or additionally, processor 121 transmits sample videos and/or video preview frames to user device 140. FIG. 3 is a flowchart of an exemplary process 300 for generating sample videos and/or video preview frames. At 302, processor 121 receives the video from camera 110 as described elsewhere in this disclosure. Processor 121 extracts sample videos from the video at 304. The extracted sample videos have a predetermined length. In some embodiments, a sample video has any length between 1 second to 60 minutes. In other embodiments, the length of a sample video may be restricted to a subrange of 1-5 seconds, 6-10 seconds, 11-20 seconds, 21-30 seconds, 31-60 seconds, 1-5 minutes, 6-10 minutes, 11-20 minutes, 21-30 minutes, 31-40 minutes, 41-50 minutes, or 51-60 minutes. In some embodiments, a length of extracted sample videos may vary. For example, 10-second sample videos are previously extracted. If a special event is identified at a time point (as described elsewhere in this disclosure), processor 121 extracts a sample video covering the whole special event. In other embodiments, processor 121 increases the length of sample videos around the time stamp(s) associated with the identified special event appearing in the video. For example, instead of extracting 10-second sample videos, processor 121 extracts 30-second sample videos around the time stamp(s) associated with the special event. Processor 121 then extracts 10-second sample videos if no special event appears in the video within a period of time (e.g., 2 minutes).

In some embodiments, after extracting a sample video, processor 121 skips a certain period of time before extracting another sample video. Merely by way of example, after extracting from the video a first sample video with a length of 10 seconds, processor 121 skips 20 seconds of the video. Processor 121 then extracts a second sample video with a length of 10 seconds, and skips 20 seconds of the video before extracting a third sample video. In other words, processor 121 extracts a 10-second sample for every 30-second video. In some embodiments, the period of time of the video skipped may be any time between 1 second to 60 minutes. In other embodiments, the skipped period of time may be restricted to a subrange of 1-5 seconds, 6-10 seconds, 11-20 seconds, 21-30 seconds, 31-60 seconds, 1-5 minutes, 6-10 minutes, 11-20 minutes, 21-30 minutes, 31-40 minutes, 41-50 minutes, or 51-60 minutes.

In some embodiments, the skipped period of time of the video after extracting a sample video and before extracting another sample video may vary. For example, processor 121 previously skipped 20 seconds of the video. If no special event is identified within a period of time (e.g., 5 minutes), processor 121 skips more than 20 seconds (e.g., 1 minute, 2 minutes, or the like) until a special event is identified. In some embodiments, if a special event is identified at a time point, processor 121 skips less than 20 seconds (e.g., 1 or 5 seconds). In other embodiments, processor 121 does not skip at all and extract a sample video continuously until the special event ends.

In some embodiments, processor 121 also obtains the time stamp(s) associated with the extracted sample videos (e.g., the starting time point, the ending time point, and/or duration of a sample video).

At 306, processor 121 extracts one or more video preview frames. For example, processor 121 extracts one or more video preview frames from the sample videos extracted in step 304. In other embodiments, processor 121 may extract video preview frames from the video received at step 302 (the dashed line coming out of box 302 to box 306). Alternatively or additionally, processor 121 selects one or more video frames associated with a special event as video preview frames.

Processor 121 may also obtain a time stamp for the video preview frames (i.e., the time point of the video preview frame appearing in the video). In some embodiments, processor 121 may extract one video preview frame from each of the extracted sample videos. In other embodiments, one video preview frame is extracted for every period of time of a sample video. Merely by way of example, one video preview frame is extracted for every 5-second video included in a sample video. Processor 121 extracts two video preview frames for a sample video with a length of 10 seconds, and four video preview frames for a sample video with a length of 20 seconds. In some embodiments, the rate of extracting video preview frames from sample videos may vary. For example, processor 121 may extract one video preview frame for every 5-second of a sample video if no special event is identified, but may extract one video preview frame for 1-second of a sample video around the time window of a special event. In other embodiments, processor 121 may extract video preview frames from the video received in a similar fashion with respect to extracting video preview frames from sample videos described above.

In some embodiments, processor 121 also converts video preview frames into a lower-resolution version thereof. Merely by way of example, processor 121 may convert a video preview frame with a resolution of 1280×720 to an image with a resolution of 640×360, or 320×180, or the like. Alternatively or additionally, a thumbnail image may be obtained for each of the video preview frames and transmitted to user device 140.

In some embodiments, instead of being generated by computing device 120, sample videos and/or video preview frames are generated by camera 110 based on process 300 as described above. In some embodiments, camera 110 is also configured to transmit captured video(s), sample videos, and/or video image frames (or lower-resolution version or thumbnail images thereof) to computing device 120 and/or user device 140.

Referring again to FIG. 2, the captured video(s), sample videos, video preview frames (or thumbnail images thereof), and/or information relating to the detected special event(s) (if any) are transmitted to user device 140 via network 130. After receiving the data, user device 140 presents to the user the received video, sample videos, video preview frames (or thumbnail images thereof), and/or information relating to the special event(s) in a UI.

Figure 4:
FIG. 4 is an exemplary user interface (UI) for displaying a video and/or video preview frames thereof according to some embodiments.

FIG. 4 is an exemplary UI 400 presented at display 145 of user device 140. As illustrated in FIG. 4, display 145 of user device 140 displays a video in an area 401 of UI 400. The video played in area 401 is a video transmitted by camera 110 and/or computing device 120. The video played may be the video captured by camera 110 and/or sample videos generated based thereon as described elsewhere in this disclosure. In other embodiments, the video played may be a streaming video transmitted by camera 110 in real time. In some embodiments, UI 400 also includes a scroll bar 402 configured to display a time counter indicating the length of the video. The time counter also indicates the elapsed time from the start time of the video. Alternatively or additionally, the time counter further indicates the time of the video being captured (e.g., about 16:00 to about 20:00 shown in FIG. 4). In some embodiments, scroll bar 402 is configured to receive the user's input for moving scroll bar 402 such that the video can be played at a desired position. For example, the user can touch and drag a line 405 to any position along scroll bar 402, and the video will begin to play from the corresponding time point.

In some embodiments, one or more video preview frames are displayed in UI 400. For example, as illustrated in FIG. 4, a video preview frame (or a thumbnail image thereof) is displayed in an area 403. Selecting a video preview frame among the received video preview frames to be displayed is based on the user's input. For example, the user touches or drags line 405 to a desired position on scroll bar 402, and the video preview frame with a time stamp that is the closest to the corresponding time point is selected for displaying. In some embodiments, one or more video preview frames (or thumbnail images thereof) representing the video at different time points are displayed in UI 400.

Figure 5:
FIG. 5 is an exemplary UI for displaying a video and/or video preview frames thereof according to some embodiments.

FIG. 5 is another exemplary UI 500. As illustrated in FIG. 5, a plurality of video preview frames (or thumbnail images thereof) representing the video from about 16:00 to about 20:00 are displayed in an area 502 of UI 500. In some embodiments, one or more video preview frames are selected for display for each predetermined period of time of the video. For example, processor 141 of user device 140 selects two video preview frames to be displayed for every hour of the video. Merely by way of example, processor 141 selects a first video preview frame with the time stamp that is the closest to 15 minutes from the top of the hour. Processor 141 also selects second video preview frame with the time stamp that is the closest to 45 minutes from the top of the hour. Alternatively, a predetermined number of video preview frames is selected for display for the video. For example, if the video lasts for four hours and 12 video preview frames will be displayed, three video preview frames are selected for display for every hour of the video. In other embodiments, if the video lasts for 2 hours and 12 video preview frames are to be displayed, 6 video preview frames are selected for display for every hour of the video.

Referring again to FIG. 4, in some embodiments, UI 400 further includes one or more indicators indicating the special event(s) detected in the video. For example, as illustrated in FIG. 4, indicators 404A-404C are displayed to indicate three special events detected in the video. The length of an indicator represents the duration of the corresponding special event occurring in the video. For example, as illustrated in FIG. 4, indicator 404B indicates that a special event occurs from about 16:50 to about 17:15. Alternatively or additionally, one or more indicators may be color-coded, and a color may represent an alert level or category associated with the special event. For example, as illustrated in FIG. 4, indicators 404A and 404C have a first color, which is selected to represent a first alert level or a first category (e.g., a medium alert level). Indicator 404B has a second color, which is selected to represent a second alert level or a second category (e.g, a high alert level). The color of an indicator for indicating a special event is based on the information of the alert level associated with the special event received from computing device 120. In some embodiments, additional information relating to a special event is displayed in UI 400 (not shown), including, for example, the time stamp and/or time windows of the special event, a category of the special event, etc. Alternatively, the user can tap an indicator, and the information relating to the special event is displayed in UI 400 (not shown).

In some embodiments, the video is played around the time when a special event occurred, in response to the user's input. For example, the user taps an indicator, and the video is played at the beginning of the portion of the video during which the special event is detected. Alternatively or additionally, the user moves scroll bar 402 and/or line 405 to any position of an indicator such that the video is played at the corresponding position.

Figure 6:
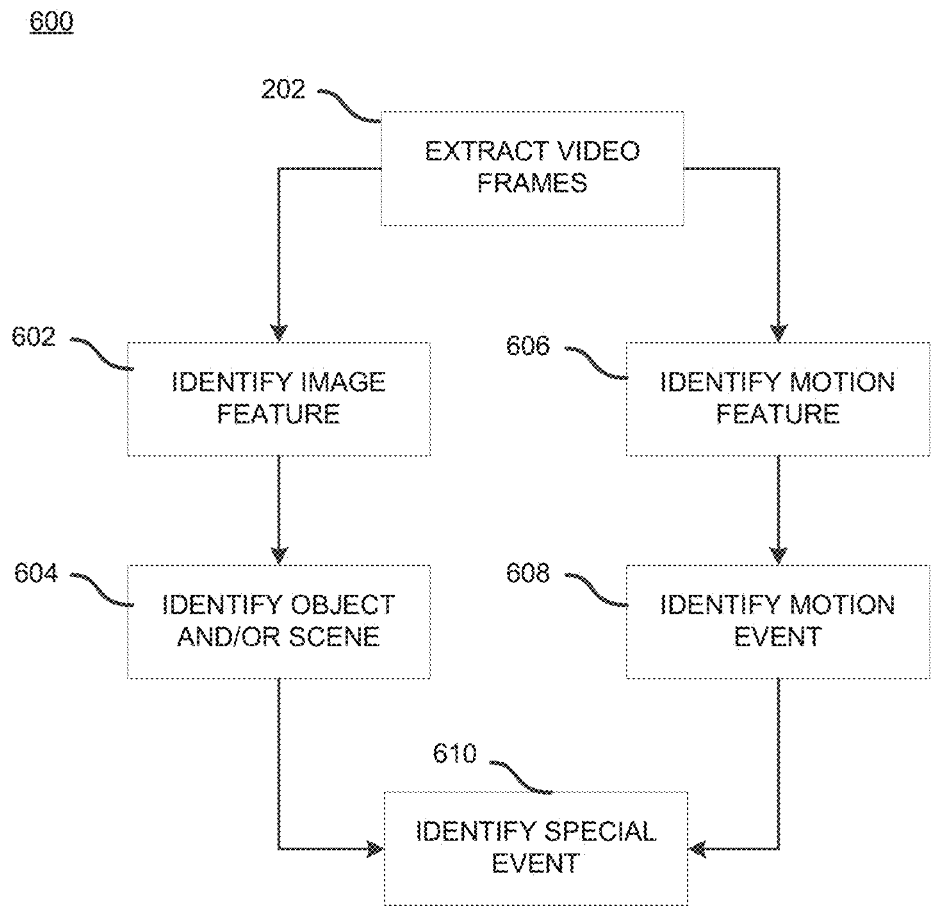
FIG. 6 is a flowchart of an exemplary process for identifying a special event based on one or more video frames according to some embodiments.

Referring again to FIG. 2, in some embodiments, video frames extracted at step 202 are analyzed at step 204 for detecting one or more special events based on an exemplary process 600 shown in FIG. 6. As illustrated in FIG. 6, at 602, processor 121 identifies one or more image features included in the extracted video frames obtained at step 202. Exemplary image feature(s) may include human bodies, human faces, pets, things, etc. The algorithm(s) for detecting one or more objects in an image may be utilized to identify image features, including, for example, blob detection, edge detection, scale-invariant feature transformation, corner detection, shape detection, etc. Other algorithms for detecting an object from an image are also contemplated.

At 604, processor 121 identifies one or more objects (or a scene) included in the identified image feature(s) by, for example, comparing the identified image feature(s) with one or more object models (and/or scene models) previously constructed. In some embodiments, processor 121 determines a matching score between an identified image feature and an object included in an object model, based on image characteristics of the image feature and those of the object model. An object (or scene) model is generated by processor 121 based on one or more images of a known object (or scene). For example, processor 121 receives an image of the user's pet. Properties and/or characteristics of the portion image including the pet are extracted and saved as an object model associated with the user's pet. The object model may include other information. For example, the object model may include a type of the object (e.g., a human body, human face, thing, pet, etc.). Alternatively or additionally, the object model may include an alert level and/or category associated with the object of the object model. In some embodiments, an object and/or scene model is generated by a third party, and processor 121 is configured to access the object model. For example, the object model associated with a wanted criminal suspect may be downloaded from police's website and saved in memory 122 for future use, as described elsewhere in this disclosure. In some embodiments, processor 121 also determines a type of the identified image feature(s). Processor 121 further identifies the object(s) included in the image feature(s). For example, processor 121 determines that the detected image feature is a man's face by comparing the image feature and one or more object models. Processor 121 also determines the face detected in the video frame may be the face of a wanted man.

Alternatively or additionally, referring to 606, processor 121 identifies one or more motion features included in a video frame and its preceding (or subsequent) video frame. A motion feature is an area of sequential video frames in which the pixel values change from a video frame to a preceding (or subsequent) video frame caused by a moving object. In some embodiments, processor 121 determines a difference between a video frame and its preceding (or subsequent) video frame by, for example, comparing pixel values of the video frame and the preceding (or subsequent) video frame. If the difference is equal to or exceeds a threshold, processor 121 identifies the area as a motion feature.

Processor 121, at 608, identifies one or more motion events based on the identified motion feature(s). In some embodiments, processor 121 accesses one or more motion models previously constructed and stored in memory 122. Processor 121 identifies one or more motion events by, for example, comparing the identified motion feature(s) with the motion model(s). For example, processor 121 identifies the moving object(s) as a moving pet or human being by, for example, comparing the motion feature(s) detected with the motion feature included in a motion model.

A motion model used for identifying motion features is generated by processor 121 based on a known motion feature previously identified. For example, processor 121 previously identifies a motion feature caused by the user's pet. Properties and/or characteristics of the sequential video frames are extracted and analyzed. A motion model can be created based on the properties and/or characteristics of the sequential image frames for the moving pet. A motion model may have other information. For example, a motion model may include a type of the moving object (e.g., a human body, human face, thing, pet, etc.). Alternatively or additionally, a motion model may include an alert level and/or category associated with the moving object of the motion model. In some embodiments, a motion model is generated by a third party, and processor 121 is configured to access the motion model.

At 610, processor 121 detects one or more special events based on the object(s) and scene identified at 604, and/or the moving object(s) identified at 608. Process 200 (as illustrated in FIG. 2) proceeds at 208, as described elsewhere in this disclosure.

Figure 7:
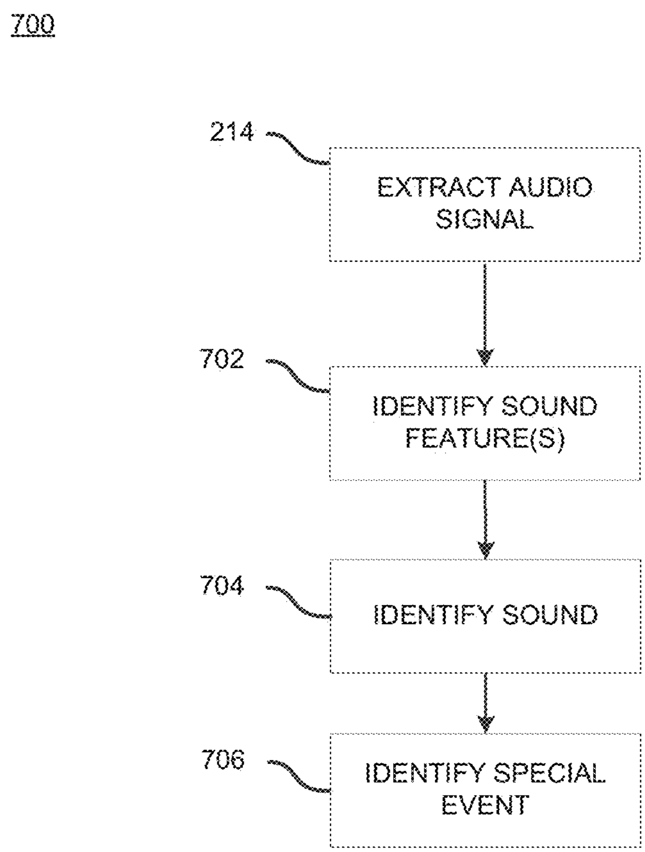
FIG. 7 is a flowchart of an exemplary process for identifying a special event based on a sound signal of a video according to some embodiments.

Referring again to FIG. 2, in some embodiments, the audio signal extracted at step 214 is analyzed for detecting one or more special events based on an exemplary process 700 shown in FIG. 7. As illustrated in FIG. 7, at 702, processor 121 identifies one or more sound features included in the exacted audio signal. In some embodiments, a sound feature is a sound causing a change of ambient sound level (dB) or a sound that is different from ambient sound (e.g., sound caused by a pet). For example, processor 121 determines a change in sound level of the audio signal. If the change is equal to or greater than a threshold, processor 121 identifies the change as a sound feature.

At 704, processor 121 identifies the sound (e.g., speech, sound of glass shattering, crying, scream, sound caused by an animal, etc.) by, for example, comparing the sound feature(s) with one or more sound models. In some embodiments, processor 121 determines a matching score between acoustic characteristics of a sound feature and those of a sound model.

A sound model is generated by processor 121 based a known sound (e.g., scream, crying, sound of glass shattering, etc.). For example, acoustic characteristics of a known person's voice are extracted and saved as a sound model associated with the person. A sound model may include other information. For example, a sound model may include a type of the sound (e.g., speech, sound of glass shattering, crying, scream, sound caused by an animal, etc.). Additionally, a sound model may include an alert level and/or category associated with the sound model. In some embodiments, a sound model may be generated by a third party, and processor 121 is configured to access the object model.

In some embodiments, processor 121 also determines a type of the identified sound feature(s). Processor 121 further determines the identity or cause of the sound for the sound feature(s). For example, processor 121 determines that the sound feature is a sound of a window-breaking and is caused by a break-in through a window.

Processor 121 may, at 706, detects one or more special events based on the sound identified. Process 200 (as illustrated in FIG. 2) proceeds at 220, as described elsewhere in this disclosure.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A device for presenting a preview of a video, the device comprising:

a memory device configured to store instructions; and one or more processors configured to execute the instructions to:

receive a plurality of video preview frames and information relating to a special event detected in the video, wherein an identified feature is identified by determining whether a difference between a video frame and a preceding or subsequent video frame is equal to or exceeds a threshold, wherein the difference is a difference of pixel values or a difference of sound levels, the special event is identified from an analysis of the video by comparing the identified feature with one or more object, motion, or sound models, and includes at least one of an object, a moving object, or a sound detected in the video, and the plurality of video preview frames are extracted from the video, wherein a rate of extracting video frames increases upon identification of the special event;

wherein the one or more processors are further configured to skip a time period before extracting the plurality of video preview frames and after extracting the plurality of video preview frames based on whether the special event is detected in a previous time period, wherein the skipped time period before extracting the plurality of video preview frames is different from the skipped time period after extracting the plurality of video preview frames; and a display in communication with the one or more processors configured to:

display at least one of the plurality of video preview frames, which were received, and display an indicator indicating the special event.

2. The device of claim 1, wherein the received information relating to the special event includes a category or alert level associated with the special event.

3. The device of claim 2, wherein:

the indicator is color coded, and a color of the indicator represents the category or alert level associated with the special event.

4. The device of claim 1, wherein:

the information relating to the special event includes a time stamp associated with the special event;

the one or more processors are further configured to execute the instructions to receive, from a server or a camera, the video; and the display is further configured to:

receive, from a user, one or more inputs; and play, in response to the one or more inputs, a portion of the video around the time stamp associated with the special event.

5. The device of claim 1, wherein the display is further configured to display two or more video preview frames, the two or more video preview frames appearing at different time points in the video.

6. The device of claim 1, wherein the indicator has a length, the length representing a duration of the special event appearing in the video.

7. The device of claim 1, wherein the one or more object, motion, or sound models includes at least one of: properties or characteristics of a portion of an image, properties or characteristics of a portion of a sound, a type of the object, a type of the motion, a type of the sound, an alert level associated with the object, motion, or sound, or a category associated with the object, motion, or sound.

8. A system for generating a plurality of video preview frames for a video, the system comprising:

a memory device that stores instructions; and one or more processors that are configured to execute the instructions to:

generate or access one or more object, motion, or sound models;

receive a video;

analyze the video;

identify an identified feature by determining whether a difference between a video frame and a preceding or subsequent video frame is equal to or exceeds a threshold, wherein the difference is a difference of pixel values or a difference of sound levels;

identify a special event from an analysis of the video by comparing the identified feature with the one or more object, motion, or sound models, the special event including at least one of an object, a moving object, or a sound detected in the video;

obtain at least one video frame representing the special event, wherein a rate of obtaining video frames increases upon identification of the special event;

wherein the one or more processors are further configured to skip a time period before obtaining the plurality of video preview frames and after obtaining the plurality of video preview frames based on whether the special event is detected in a previous time period, wherein the skipped time period before obtaining the plurality of video preview frames is different from the skipped time period after obtaining the plurality of video preview frames; and transmit, to a user, the at least one video frame representing the special event and information relating to the special event.

9. The system of claim 8, wherein the one or more processors are further configured to:

obtain one or more video frames from the video;

detect an object from the one or more video frames; and identify a first special event corresponding to the detected object.

10. The system of claim 9, wherein the one or more processors are further configured to:

extract an audio signal from the video;

detect a sound included in the audio signal;

identify a second special event corresponding to the detected sound; and associate the first and second special events if the first and second special events appear in the video around a same time.

11. The system of claim 9, wherein the one or more processors are further configured to:

extract an audio signal from the video;

detect a sound included in the audio signal;

identify a special event corresponding to the detected sound.

12. The system of claim 8, wherein the one or more object, motion, or sound models includes at least one of: properties or characteristics of a portion of an image, properties or characteristics of a portion of a sound, a type of the object, a type of the motion, a type of the sound, an alert level associated with the object, motion, or sound, or a category associated with the object, motion, or sound.

13. A method for presenting a preview of a video, the method comprising:

receiving a plurality of video preview frames and information relating to a special event detected in the video, wherein an identified feature is identified by determining whether a difference between a video frame and a preceding or subsequent video frame is equal to or exceeds a threshold, wherein the difference is a difference of pixel values or a difference of sound levels, the special event is identified from an analysis of the video by comparing an identified feature with one or more object, motion, or sound models, and includes at least one of an object, a moving object, or a sound detected in the video, and the plurality of video preview frames are extracted from the video, wherein a rate of extracting video frames increases upon identification of the special event;

a time period is skipped before extracting the plurality of video preview frames and after extracting the plurality of video preview frames based on whether the special event is detected in a previous time period, wherein the skipped time period before extracting the plurality of video preview frames is different from the skipped time period after extracting the plurality of video preview frames;

displaying at least one of the plurality of video preview frames, which were received; and displaying an indicator indicating the special event.

14. The method of claim 13, wherein the received information relating to the special event includes a category or alert level associated with the special event.

15. The method of claim 14, wherein:

the indicator is color coded, and a color of the indicator represents the category or alert level associated with the special event.

16. The method of claim 13, further comprising:

receiving, from a server or a camera, the video;

receiving, from a user, one or more inputs; and playing, in response to the one or more inputs, a portion of the video around a time stamp associated with the special event.

17. The method of claim 13, further comprising displaying two or more video preview frames, the two or more video preview frames appearing at different time points in the video.

18. The method of claim 13, wherein the indicator has a length, the length representing a duration of the special event appearing in the video.

19. The method of claim 13, wherein the one or more object, motion, or sound models includes at least one of: properties or characteristics of a portion of an image, properties or characteristics of a portion of a sound, a type of the object, a type of the motion, a type of the sound, an alert level associated with the object, motion, or sound, or a category associated with the object, motion, or sound.

20. A method for generating a plurality of video preview frames for a video, comprising:

generating or accessing one or more object, motion, or sound models;

receiving a video;

analyzing the video;

identifying an identified feature by determining whether a difference between a video frame and a preceding or subsequent video frame is equal to or exceeds a threshold, wherein the difference is a difference of pixel values or a difference of sound levels;

identifying a special event from an analysis of the video by comparing the identified feature with the one or more object, motion, or sound models, the special event including at least one of an object, a moving object, or a sound detected in the video;

obtaining at least one video frame representing the special event, wherein a rate of obtaining video frames increases upon identification of the special event;

skipping a time period before obtaining the plurality of video preview frames and after obtaining the plurality of video preview frames based on whether the special event is detected in a previous time period, wherein the skipped time period before obtaining the plurality of video preview frames is different from the skipped time period after obtaining the plurality of video preview frames; and transmitting, to a user, the at least one video frame representing the special event and information relating to the special event.

21. The method of claim 20, further comprising:

obtaining one or more video frames from the video;

detecting an object from the one or more video frames; and identifying a first special event corresponding to the detected object.

22. The method of claim 21, further comprising:

extracting an audio signal from the video;

detecting a sound included in the audio signal;

identifying a second special event corresponding to the detected sound; and associating the first and second special events if the first and second special events appear in the video around a same time.

23. The method of claim 20, wherein the one or more object, motion, or sound models includes at least one of: properties or characteristics of a portion of an image, properties or characteristics of a portion of a sound, a type of the object, a type of the motion, a type of the sound, an alert level associated with the object, motion, or sound, or a category associated with the object, motion, or sound.

24. A non-transitory computer readable medium embodying a computer program product, the computer program product comprising instructions configured to cause a computing device to:

receive a plurality of video preview frames and information relating to a special event detected in the video, wherein an identified feature is identified by determining whether a difference between a video frame and a preceding or subsequent video frame is equal to or exceeds a threshold, wherein the difference is a difference of pixel values or a difference of sound levels, the special event is identified from an analysis of the video by comparing the identified feature with one or more object, motion, or sound models, and includes at least one of an object, a moving object, or a sound detected in the video, the plurality of video preview frames are extracted from the video, wherein a rate of extracting video frames increases upon identification of the special event, wherein time period is skipped before extracting the plurality of video preview frames and after extracting the plurality of video preview frames based on whether the special event is detected in a previous time period, wherein the skipped time period before extracting the plurality of video preview frames is different from the skipped time period after extracting the plurality of video preview frames;

display at least one of the plurality of video preview frames, which were received; and display an indicator indicating the special event.

25. The non-transitory computer readable medium of claim 24, wherein the one or more object, motion, or sound models includes at least one of: properties or characteristics of a portion of an image, properties or characteristics of a portion of a sound, a type of the object, a type of the motion, a type of the sound, an alert level associated with the object, motion, or sound, or a category associated with the object, motion, or sound.

* * * * *